Feb. 10, 1970    F. E. BURDETTE    3,494,679

THRUST BEARING OIL SEAL SYSTEM

Filed Jan. 30, 1968    2 Sheets-Sheet 1

INVENTOR.
FREDRICK E. BURDETTE
BY
Herschel C. Omohundro
ATTORNEY

Feb. 10, 1970   F. E. BURDETTE   3,494,679
THRUST BEARING OIL SEAL SYSTEM
Filed Jan. 30, 1968   2 Sheets-Sheet 2

INVENTOR.
FREDRICK E. BURDETTE
BY
Herschel C. Omohundro
ATTORNEY

United States Patent Office 3,494,679
Patented Feb. 10, 1970

3,494,679
THRUST BEARING OIL SEAL SYSTEM
Fredrick E. Burdette, Torrance, Calif., assignor to The Garrett Corporation, Los Angeles, Calif., a corporation of California
Filed Jan. 30, 1968, Ser. No. 701,619
Int. Cl. F16c *33/72;* F16j *15/00*
U.S. Cl. 308—36.1                             12 Claims

ABSTRACT OF THE DISCLOSURE

The thrust bearing oil seal system herein has a housing with a wall between regions containing fluids such as air and oil mist at different pressures. The wall has an opening through which the rotatable drive shaft of an impeller extends. A thrust collar with a pair of axially spaced shoulders is secured to the shaft, the collar having a boss portion projecting into the wall opening with limited clearance. The collar also has a circular enlargement provided with a plurality of radiating holes which serve, when the shaft rotates, to sling oil collecting around the inner end of the opening outwardly to collect on adjacent portions of the wall and drain into the housing. A thrust bearing element is nonrotatably secured to the housing and projects into the space between the shoulders on the thrust collar. It has pads for engagement with the shoulders to limit axial movement of the shaft and pressurized oil passages lead to the pads for forced lubrication.

Summary

This invention relates generally to seals, and more particularly to seals employed between relatively movable elements such as shafts and adjacent supports. Still more particularly, the invention is directed to a combined thrust bearing and oil sealing system for use in a mechanism such as a supercharger, having regions containing fluids under different pressures and compositions which it may be undesirable to mix, especially in one of the regions.

An object of this invention is to provide a thrust bearing oil seal system which serves to retain a rotating shaft against longitudinal excursions, and is effective to prevent the seepage of oil or other lubricating medium between regions containing fluids under varying differential pressures and which should be kept separated for a variety of reasons, one being to prevent the loss of one fluid such as lubricating oil. Other reasons will depend upon the use to which the system may be adapted.

Another object of the invention is to provide a thrust bearing oil seal combination having means for attachment to a rotatable shaft adjacent a wall through which the shaft extends, the means including thrust absorbing surfaces, a seal component, and centrifugally responsive elements for removing oil from the vicinity of the wall opening through which the shaft extends.

Still another object is to provide the combination mentioned in the preceding paragraph with structure particularly designed to cooperate with the thrust absorbing surfaces and provide Kingsbury-type ramps to which a lubricating medium is supplied under pressure, the centrifugally responsive elements serving to prevent the excess lubricating medium, as well as that entrained in the air, from escaping through the wall opening around the shaft.

A further object of this invention is to minimize friction power loss by maintaining the minimum radial distance from the Kingsbury-type ramps to the axial center line. This distance must be consistent with adequate velocity at the ramp to produce enough dynamic oil pressure to support the thrust loads.

A still further object is to provide a bearing having a sufficient quantity and distribution of ramps around the thrust bearing periphery to adequately damp certain shaft excursions caused by unbalance and oil film disturbances in the journal bearings.

An additional object is to provide a thrust bearing oil seal combination which is simple in construction, is composed of a minimum number of parts, is particularly adaptable to manufacture by powdered metal technique, is easy to assemble, and is positive in operation.

Other objects and advantages will be apparent from the following description of one embodiment of the invention illustrated in detail in the accompanying drawings.

The drawings

Description

Figure 1:
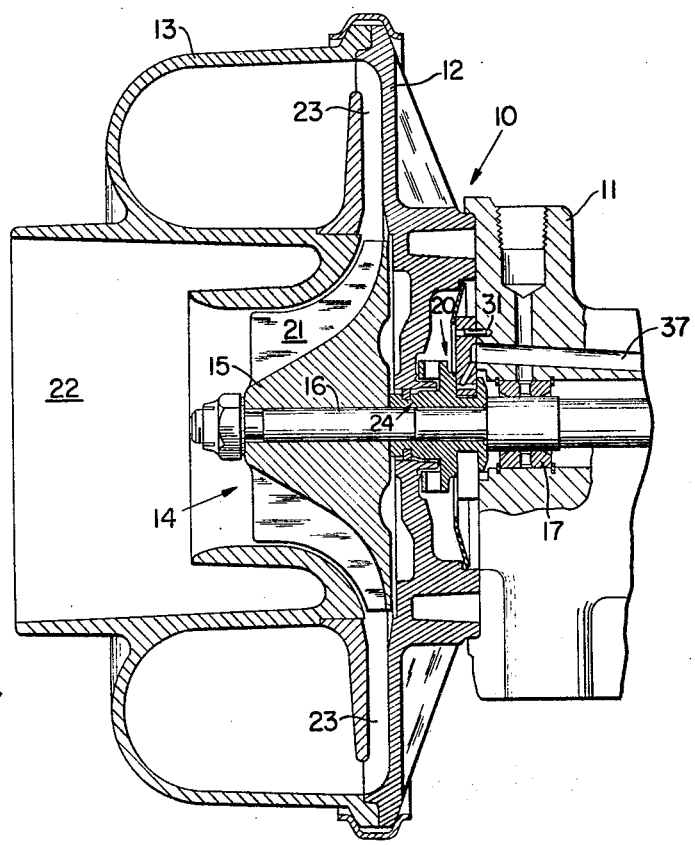
FIG. 1 is an axial sectional view taken through the compressor end of a supercharger provided with a thrust bearing oil seal combination formed in accordance with the present invention.

Referring more particularly to FIG. 1 of the drawing, the numeral 10 designates generally the compressor end of a supercharger which has been selected to illustrate the invention. It should be obvious that the thrust bearing oil seal combination is suitable for use in many installations, the supercharger being selected merely for the present showing.

The supercharger includes a center housing 11, a back plate 12, and a combination inlet and torus 13. These elements are assembled in any suitable manner and form the support for an impeller assembly 14. The latter assembly includes an impeller 15 and shaft 16, suitable bearings 17 being provided in the center housing to rotatably support the impeller assembly 14. The back plate or wall 12 separates regions 18 and 19 formed in the center housing and torus 13 which regions may contain fluids such as air, gases, or other compounds. At times such fluids may be at different pressures.

The seal portion of the combination, generally designated by the numeral 20, has been provided to prevent or minimize the transfer of fluids from one region to the other, particularly during the operation of the supercharger. Impeller 15 is constructed with a plurality of blades or vanes 21 which, as the impeller revolves, draw air from the inlet 22 and discharge it centrifugally through diffuser passages 23 into the interior of the torus 13. At times, reduced pressures may prevail in the inlet and region around the impeller due to clogging of a filter (not shown) disposed in advance of the inlet 22. At other times, super-atmospheric pressure may prevail around the periphery of the impeller and regions, such as the space at the back of the impeller, communicating therewith. During these various times, there may be a tendency for fluids to seep from one side of the back plate or wall 12 to the other. It will be pointed out hereinafter how the seal of the invention minimizes this transfer of fluids.

Figure 2:
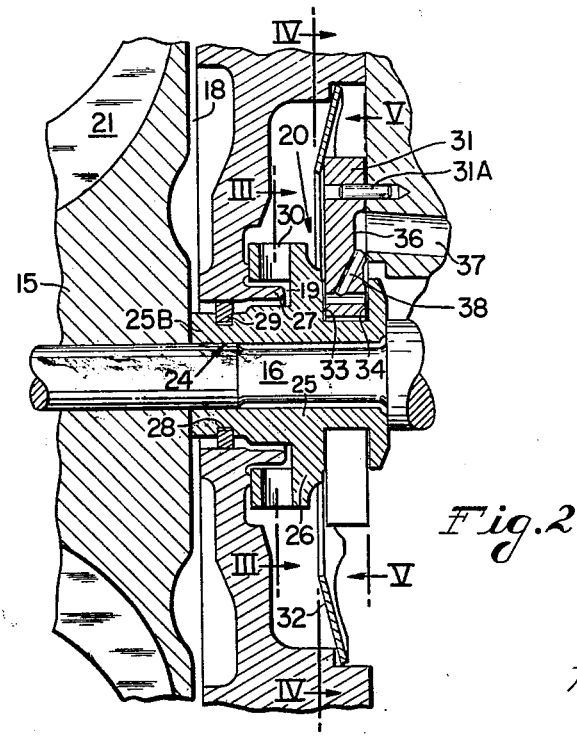
FIG. 2 is a similar view on an enlarged scale of the combination and immediately adjacent structure.
Figure 3:
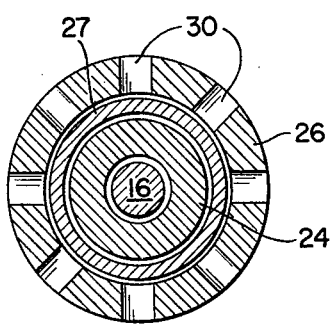
FIGS. 3, 4 and 5 are vertical transverse sectional views taken through the combination thrust bearing oil seal on planes indicated by lines III—III, IV—IV, and V—V, respectively, of FIG. 2.

As shown in FIG. 2, the seal combination includes a thrust collar 24 which is suitably secured to the shaft 16 for rotation therewith. This thrust collar has a hub 25 and a disk-like body 26, a portion of the hub forming, in effect, a boss 25B projecting from the hub. This boss 25B surrounds the portion of the shaft which extends through an opening provided in wall 12, the diameters of the boss and opening being selected to provide a predetermined minimum of clearance therebetween. The wall 12 at the side facing the region 19 is provided with a rim 27 around the opening and projecting slightly into the region 19 toward the disk-like body 26 of the thrust collar. Boss 25B is formed with an annular groove 28 for the reception of a piston ring 29 which engages the inner wall of the opening to provide sealing means. The wall 12 is relieved on the inner side around the rim 27, and body 26 of the thrust collar is also relieved on the side adjacent the wall 12 to form a groove to receive the rim 27 and provide a restricted space therearound. The portion of the disk-like body 26 surrounding the rim 27 is formed with a plurality of radially extending channels 30 consisting of holes drilled through the body from the periphery to the inner relieved portion. These holes serve as vanes during rotary movement of the impeller assembly to cause centrifugal flow of air from the region around the rim 27 and also a similar flow of lubricating medium, should any find its way to such surfaces. The center housing is provided with a sump to receive lubricating medium, and during the operation of the supercharger this lubricating medium may be entrained with air within the center housing, causing a mist. If such mist should flow to the space around the rim 27, the movement of air caused by the rotating channels 30 will also cause movement of the mist in a generally outward direction where it may collect on the adjacent portions of the wall 12 and gravitate to the sump in the center housing.

Figure 4:
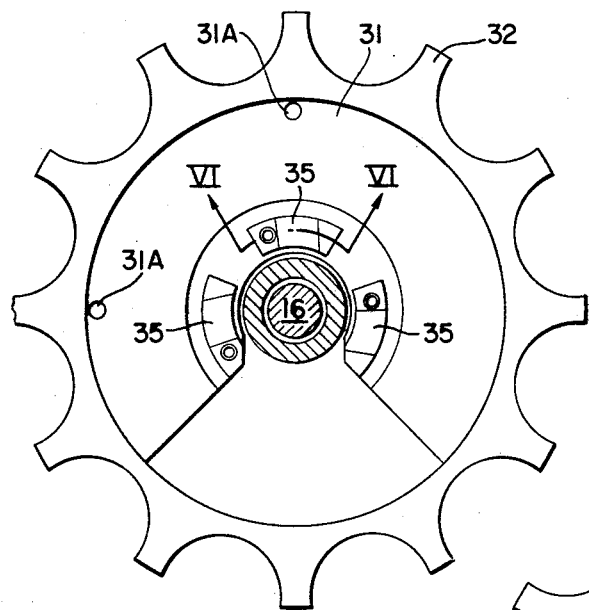
Figure 5:
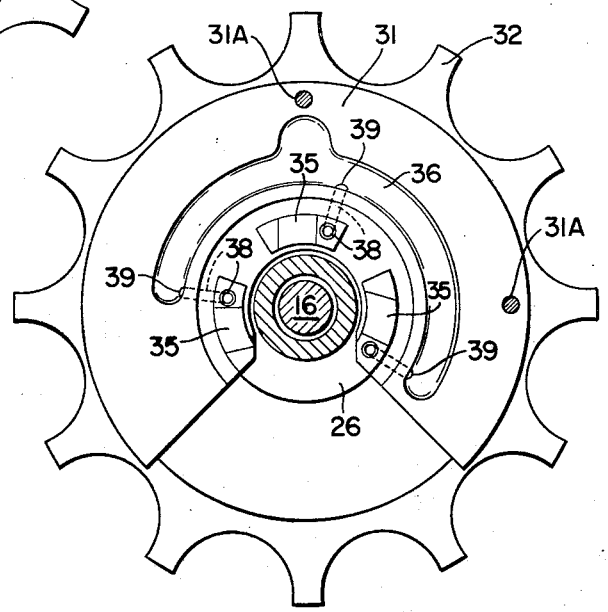
Figure 6:
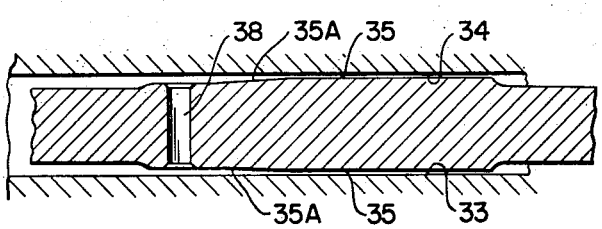
FIG. 6 is a detail sectional view on a greatly enlarged scale taken thorugh one of the pads on the thrust bearing on a line VI—VI of FIG. 5.

The thrust bearing oil seal combination 20 also includes a thrust bearing element 31 which is suitably secured to the center housing. This element is of partially circular form, and as shown in FIGS. 4 and 5, has a central opening to receive shaft 16 and a portion of thrust collar surrounding the same. A wedge-shaped portion of element 31 is removed to permit it to be moved over the shaft and thrust collar from one side. Thrust bearing element 31 is disposed on a plurality of pins 31A projecting into space 19 from the center housing. It is maintained in this position by a spring 32 of generally annular form, the spring being provided at its periphery with spaced fingers for engagement with a shoulder on the wall 12; the inner edge of the annular spring element engages the thrust bearing. When the wall 12 is secured to the center housing the spring will be flexed to urge the thrust bearing toward the center housing to maintain its position. The relieved portion of thrust bearing element 31 permits the reception of a neck 25A formed on the thrust collar between opposed shoulders 33 and 34. These shoulders are engaged by pads 35 formed on opposite sides of the thrust bearing. As illustrated in the enlarged view of FIG. 6, the pads are relieved at their ends to provide inclined portions 35A which form Kingsbury-type ramps. A plurality of circularly spaced pads is provided on each side of the thrust bearing.

As shown in FIG. 5, the thrust bearing is also formed on one side with an arcuate recess 36 which communicates with a passage 37 provided in the center housing. Drilled openings 38 extend from the recess 36 to other openings 39 formed in the thrust bearing adjacent the leading edges of the pads 35. With this passage construction, lubricating medium under pressure supplied to passage 37 will flow to the pads 35 and tend to flow between and separate these pads from the shoulders formed on the thrust collar. Rotative movement of the thrust collar will, in addition, cause a flow of the lubricating medium into the spaces between the pads and the shoulders on the thrust collar. As previously pointed out, some of this lubricating medium may find its way to the rim around the opening in the wall 12 or to the space between the boss 25 and the wall of the opening in the wall 12. This flow may take place immediately after the turbocharger operation is discontinued.

When operation is resumed, the channels in the thrust collar will cause a flow of air, as previously described, in an outward direction and the lubricating medium will be moved by centrifugal force away from the opening. The flow of air may also reduce the pressure between the lip around the opening in the wall 12 and the boss 25 to further cause the lubricating medium to flow toward the inner ends of the radiating channels 30 and outwardly therethrough. This action tends to prevent movement of fluid from the region 19 into the region 18 even though a reduced or negative pressure exists in the region 18. The piston ring 28 also assists in preventing movement of the lubricating medium toward the region 18.

The operation of the thrust bearing oil seal combination may be summarized as follows. As shaft 16 rotates, axial movement thereof will be resisted by the engagement of the shoulders 33 and 34 on the thrust collar 24 with the pads 35 on the thrust bearing. During this action of the shaft, fluid under pressure will be supplied through passages 37 and 38 to the pads 35. Some of this fluid may find its way to the space between the thrust collar and the wall of the opening in back plate 12. Escape of this fluid will be minimized through the centrifugal action caused by the rotation of the thrust collar and the channels 30 formed therein. The deposit of oil mist on the boss 25 and around the rim 27 will also be minimized by the flow of air resulting from the rotation of the thrust collar. This flow of air results from centrifugal force.

I claim:
1. A thrust bearing oil seal system, comprising:
 (a) wall means separating regions subject to differential pressures, said wall means having an opening through which a rotatable shaft extends;
 (b) a unitary thrust collar means mounted on the shaft for rotation therewith in close proximity to the opening, said thrust collar means including a pair of spaced shoulders and a plurality of open-ended radiating channels having inner ends disposed adjacent to and communicating with the inner end of the opening in said wall means, said channels extending outwardly from said opening and serving upon rotation of said shaft to move fluid away from the vicinity of the inner end of said opening; and
 (c) thrust bearing means supported on said wall means and extending into the space between the shoulders on said collar means for engagement therewith to limit axial movement of the shaft.
2. A thrust bearing oil seal system of claim 1 in which the thrust collar means has a boss projecting into the opening in the wall means and having limited clearance from the wall means.
3. A thrust bearing oil seal system of claim 1 in which the wall means has a rim-type projection around the inner end of said opening in close proximity to the inner ends of the radiating channels in said thrust collar means.
4. A thrust bearing oil seal system of claim 1 in which the radiating channels in said thrust collar means comprise a plurality of drilled holes.
5. A thrust bearing oil seal system of claim 2 in which a piston ring is positioned between the boss of said thrust collar means and the wall of the opening in said wall means to seal the space therebetween.
6. A thrust bearing oil seal system of claim 1 in which the thrust bearing means is provided with a plurality of bearing pads for engaging the shoulders of said thrust collar means.
7. A thrust bearing oil seal system of claim 6 in which the thrust bearing means has lubricant conducting passages leading to said bearing pads.
8. A thrust bearing oil seal system of claim 6 in which portions of the bearing pads are slightly inclined to provide Kingsbury-type ramps.
9. A thrust bearing oil seal system of claim 8 in which the thrust bearing means has passages for conducting lubricant under pressure to the leading edges of said ramps.

10. A thrust bearing oil seal system of claim 1 in which interengaging means are provided between the wall means and the thrust bearing means to prevent rotary movement of the latter.

11. A thrust bearing oil seal system of claim 10 in which resilient means are provided to maintain the assembled relation of said thrust bearing means, said wall means and said interengaging means.

12. A thrust bearing oil seal system of claim 7 in which the wall means is provided with lubricant conducting passages communicating with the passages in said thrust bearing means.

References Cited

UNITED STATES PATENTS

| | | | |
|---|---|---|---|
| 1,425,000 | 8/1922 | Frost | 308—168 X |
| 1,876,515 | 9/1932 | Emmet | 308—36.3 |
| 2,054,219 | 9/1936 | Howarth | 308—160 |
| 2,266,107 | 12/1941 | Waterfill | 308—36.3 X |
| 2,362,667 | 11/1944 | Schmidt | 308—168 X |
| 2,785,022 | 3/1957 | Lakey | 308—160 |
| 2,953,416 | 9/1960 | Collins | 308—168 X |
| 3,077,296 | 2/1963 | Ping. | |
| 3,250,221 | 5/1966 | Williams | 308—160 X |
| 3,370,897 | 2/1968 | Rylatt | 308—168 |
| 3,393,947 | 7/1968 | Sandy | 308—160 |

FOREIGN PATENTS

| | | |
|---|---|---|
| 200,321 | 12/1955 | Australia. |
| 392,831 | 3/1924 | Germany. |
| 635,601 | 4/1950 | Great Britain. |

MARTIN P. SCHWADRON, Primary Examiner

LUCIOUS L. JOHNSON, Assistant Examiner

U.S. Cl. X.R.

308—160, 168, 172